No. 724,857. PATENTED APR. 7, 1903.
C. H. O. HAMANN.
PROPELLER WHEEL FOR VEHICLES.
APPLICATION FILED OCT. 31, 1902.
NO MODEL. 2 SHEETS—SHEET 2.
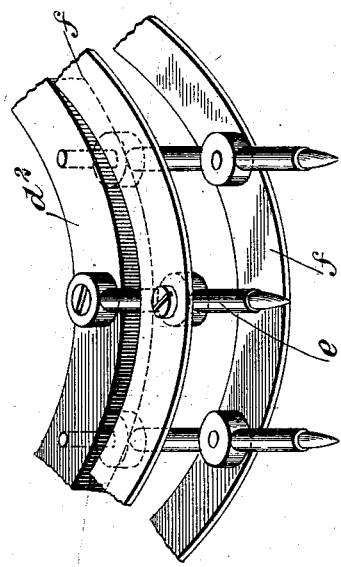
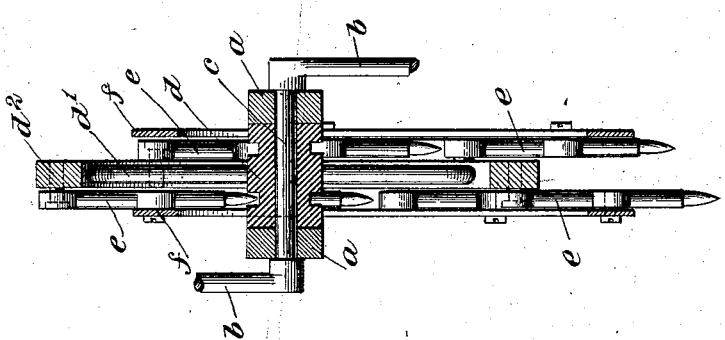
WITNESSES:
Geo. W. Naylor.
Isaac B. Owens.
INVENTOR
Carl H. O. Hamann
BY
ATTORNEYS.

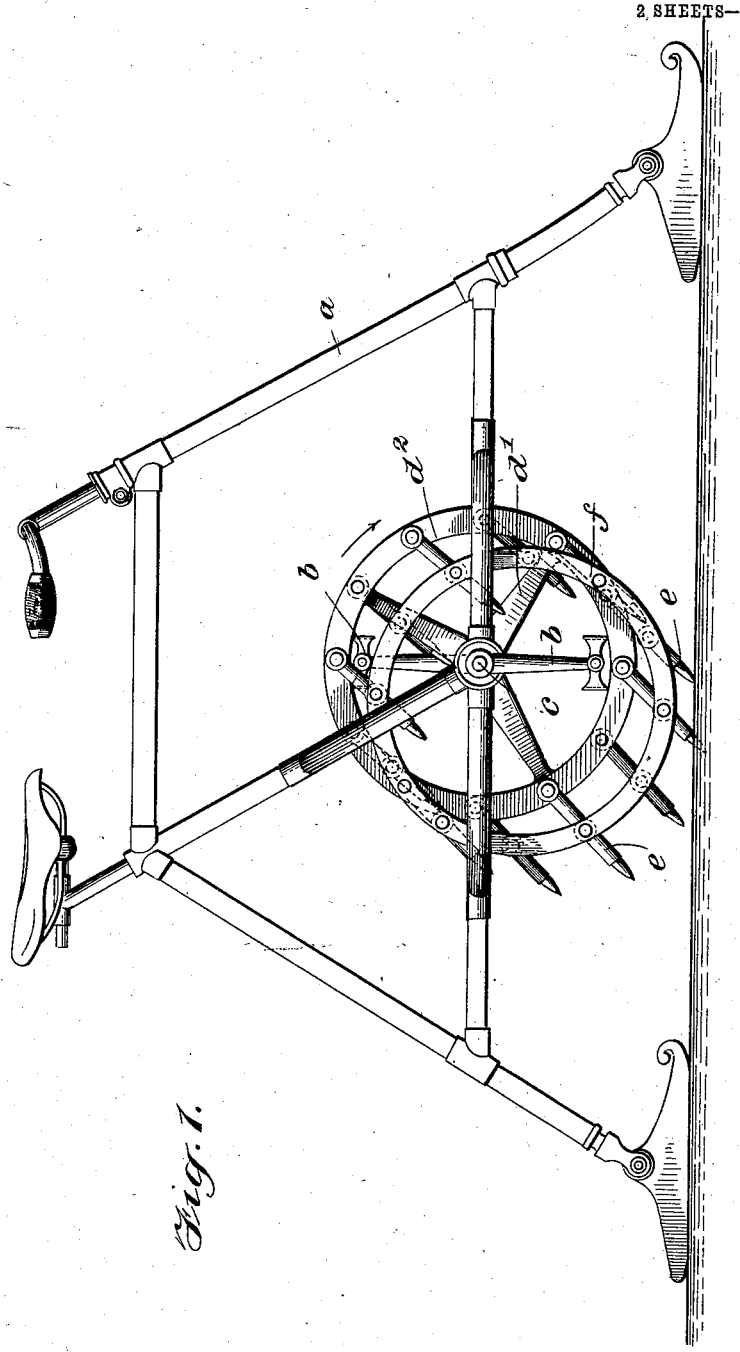

UNITED STATES PATENT OFFICE.

CARL H. O. HAMANN, OF BERGEDORF, GERMANY.

PROPELLER-WHEEL FOR VEHICLES.

SPECIFICATION forming part of Letters Patent No. 724,857, dated April 7, 1903.

Application filed October 31, 1902. Serial No. 129,571. (No model.)

*To all whom it may concern:*

Be it known that I, CARL H. O. HAMANN, a subject of the Emperor of Germany, and a resident of Bergedorf, Germany, have invented a new and Improved Propeller-Wheel for Vehicles, of which the following is a full, clear, and exact description.

This invention relates to a traction-wheel adapted to engage the ground for propelling vehicles and like service. It is especially adapted for use on bicycles, automobiles, and the like for propelling them over ice, and it is in connection with an ice-bicycle that it is here illustrated, although it should be understood that my invention is not limited to this use, but is applicable, broadly, for the purpose of propelling vehicles and for other analogous purposes, as will be apparent to skilled artizans.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a side view showing the invention in use. Fig. 2 is an enlarged section taken longitudinally of the axis of the wheel, and Fig. 3 is a fragmentary perspective view showing the manner of mounting the spurs.

Assuming that the invention is applied to an ice-vehicle, $a$ indicates the framing of the vehicle, which may be of any construction desired, and $b$ indicates the pedals, these being mounted on a crank-shaft $c$, carried suitably in the frame $a$ of the vehicle. Fastened to the shaft $c$, between the two side parts of the frame, is a wheel comprising a hub $d$, spokes $d'$, and a rim $d^2$. To this rim, at each side thereof, are pivotally connected spurs $e$, and these spurs are connected at each side of the wheel $d$ by means of rings $f$, which rings are pivoted to the spurs at points intermediate the ends thereof, and since these rings are of a diameter approximately equal to the diameter of the wheel $d$ the rings necessarily stand eccentric to the wheel.

Assuming the parts to be in the position shown in Fig. 1, when the shaft $c$ is revolved the wheel $d$ is turned around its axis and the spurs $e$ are caused to engage the ground, they being carried rearward with the wheel $d$, and thus imparting a forward movement to the vehicle. The rings $f$ also turn around with the wheel; but they always stand in eccentric relation to the wheel, thus keeping the spurs $e$ properly disposed and insuring the effective operation of the apparatus.

It will be seen that by means of the invention the spurs are caused to engage the earth in quick succession, and each imparts a slight forward impulse to the vehicle, the result of which is a steady and continued propelling influence. The movement of the wheel $d$ may be reversed, and the spurs will immediately reverse, thus driving the vehicle backward. It will also be apparent that the use of the invention is not confined to the connection here shown, but may be applied to vehicles of all sorts or, in fact, to every apparatus in which a traction-wheel is employed.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. A traction-wheel, comprising a main drive-wheel mounted to revolve on its axis at its center, two auxiliary wheels of equal diameter therewith and located one on either side thereof, and a series of spurs on each side of the main drive-wheel pivotally connected at one end to the rim thereof, and all extending in the same direction from their respective pivot-points, said auxiliary wheels being pivoted to the centers of the respective sets of spurs on the sides of the main wheel and thereby held to revolve with the main wheel always eccentric to the axis thereof with the ends of the spurs at the bottom and rear side of the wheels always projected outwardly beyond the rim of the wheels, as set forth.

2. A traction-wheel, comprising a wheel proper, a number of spurs pivotally connected at one end to the rim of the wheel, said spurs all extending in the same direction and being alternately attached to the rim of the wheel on opposite sides thereof to form two sets of spurs, one on each side of said wheel, the spurs of each set being an equal distance from each other, and the pivot-points of one set of the spurs being located midway between the pivot-points of the other set of spurs, a wheel on each side of the main wheel and of equal diameter therewith, each of said side wheels being pivoted to one of the sets of spurs at the middle portion of each of said spurs.

In testimony whereof I have signed my name to this specification in the presence of two subscribing witnesses.

CARL H. O. HAMANN.

Witnesses:
E. H. L. MUMMENHOFF,
OTTO W. HELLMRICH.